US012657749B2

(12) United States Patent
Liu et al.

(10) Patent No.: US 12,657,749 B2
(45) Date of Patent: Jun. 16, 2026

(54) IMAGE DEPTH PREDICTION METHOD, ELECTRONIC DEVICE, AND NON-TRANSITORY STORAGE MEDIUM

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 391 days.

(21) Appl. No.: 18/224,619

(22) Filed: Jul. 21, 2023

(65) Prior Publication Data

US 2024/0029283 A1     Jan. 25, 2024

(30) Foreign Application Priority Data

Jul. 22, 2022     (CN) .......................... 202210873334.4

(51) Int. Cl.
*G06T 7/55*          (2017.01)
*G06T 3/06*          (2024.01)

(52) U.S. Cl.
CPC ................. *G06T 7/55* (2017.01); *G06T 3/06* (2024.01); *G06T 2207/10028* (2013.01)

(58) Field of Classification Search
CPC ... G06T 7/55; G06T 3/06; G06T 2207/10028; G06T 7/11; G06T 2207/20081; G06T 7/30; G06T 7/10; G06T 7/70; G06T 7/80; G06T 2207/30244; G06V 10/80
See application file for complete search history.

(56) References Cited

U.S. PATENT DOCUMENTS

2021/0312650 A1 *  10/2021  Ye .......................... G06N 3/0895
2022/0180548 A1 *   6/2022  Li .......................... G06V 10/766

FOREIGN PATENT DOCUMENTS

CN          111386550          7/2020

* cited by examiner

*Primary Examiner* — Chan S Park
*Assistant Examiner* — Daniel C Chang
(74) *Attorney, Agent, or Firm* — ScienBiziP, P.C.

(57)          ABSTRACT

An image depth prediction method acquires image frames of containing a dynamic object by a monocular camera, extracts a continuous of object frames and reference frames from the image frames, reconstructs the object frames to obtain reconstructed frames according to the reference frames and a preset depth estimation model, obtains a reconstruction error between the object frames and the reconstructed frames, processes the image frames to obtain point cloud data and instance segmentation data, fuses the point cloud data with the instance segmentation data to obtain mask data, obtains a loss function according to the reconstruction error and the mask data, and trains the depth estimation model based on the loss function until the loss function converges. The method can obtain more accurate depth estimation results for dynamic scenes. An electronic device and a non-transitory storage recording the method are also disclosed.

18 Claims, 4 Drawing Sheets

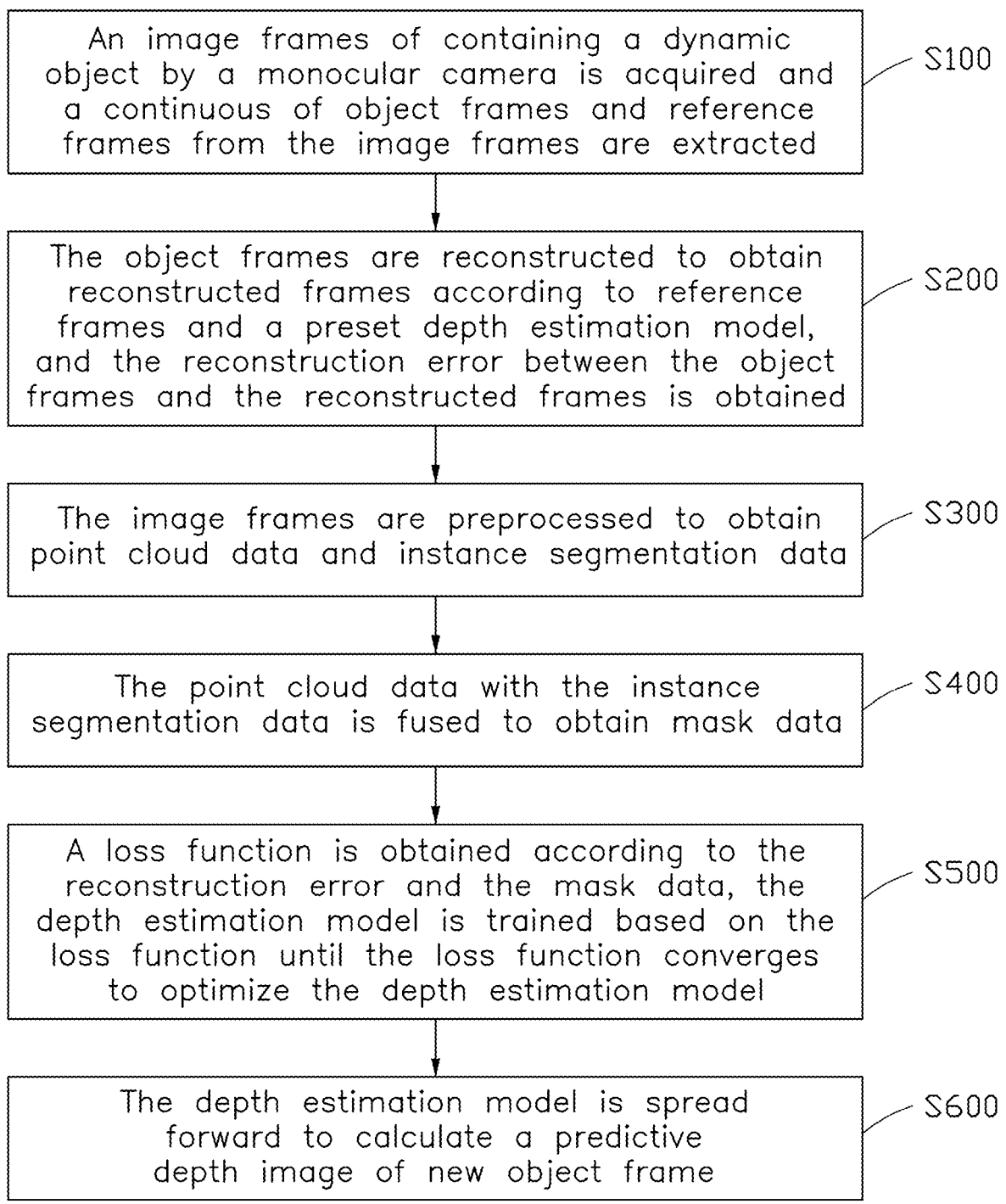

An image frames of containing a dynamic object by a monocular camera is acquired and a continuous of object frames and reference frames from the image frames are extracted ⌐ S100

The object frames are reconstructed to obtain reconstructed frames according to reference frames and a preset depth estimation model, and the reconstruction error between the object frames and the reconstructed frames is obtained ⌐ S200

The image frames are preprocessed to obtain point cloud data and instance segmentation data ⌐ S300

The point cloud data with the instance segmentation data is fused to obtain mask data ⌐ S400

A loss function is obtained according to the reconstruction error and the mask data, the depth estimation model is trained based on the loss function until the loss function converges to optimize the depth estimation model ⌐ S500

The depth estimation model is spread forward to calculate a predictive depth image of new object frame ⌐ S600

FIG. 1

IMAGE DEPTH PREDICTION METHOD, ELECTRONIC DEVICE, AND NON-TRANSITORY STORAGE MEDIUM

TECHNICAL FIELD

The subject matter herein generally relates to computer vision.

BACKGROUND

How to recover the depth information of the scene from 2D images sequentially collected into a 3D scene is an important research content in the field of computer vision. Monocular depth estimation is an important method to understand the geometric relationship of 3D scenes. The monocular depth estimation refers to the process of obtaining the depth data corresponding to a picture or a video by processing the picture or the video taken by the monocular camera. The video captured by monocular camera is called a monocular video. When shooting a monocular video, there may be differences between adjacent frames in the captured monocular video due to uncontrollable factors, such as shaking of the camera, object movement in the shooting scene, and noise. These factors can lead to large jitter in monocular depth estimation of the monocular video, and the depth data of two adjacent video frames can be quite different.

In order to suppress the jittering of the camera, at present, according to the images from different time and perspective, the deep learning method of monocular depth estimation mainly uses the SFM (Structure From Motion) principle to let the model infer the object depth, and reconstructs the image of the object perspective using the reference image. The reconstructed image from the depth estimation with lower error rates can be closer to the original object image, but the reconstructed image similarity cannot accurately represent the degree of depth error in the following scenarios because moving objects do not conform to SFM's viewpoint pose transformation and cannot be correctly reconstructed.

The existing technology can not completely filter out moving objects in the process of training the monocular depth estimation model, which makes the accuracy of the model depth estimation low, and the model parameters cannot be optimized.

BRIEF DESCRIPTION OF THE DRAWINGS

Implementations of the present disclosure will now be described, by way of embodiments, with reference to the attached figures.

FIG. 1 is a flowchart of an embodiment of an image depth prediction.

DETAILED DESCRIPTION

Figure 2:
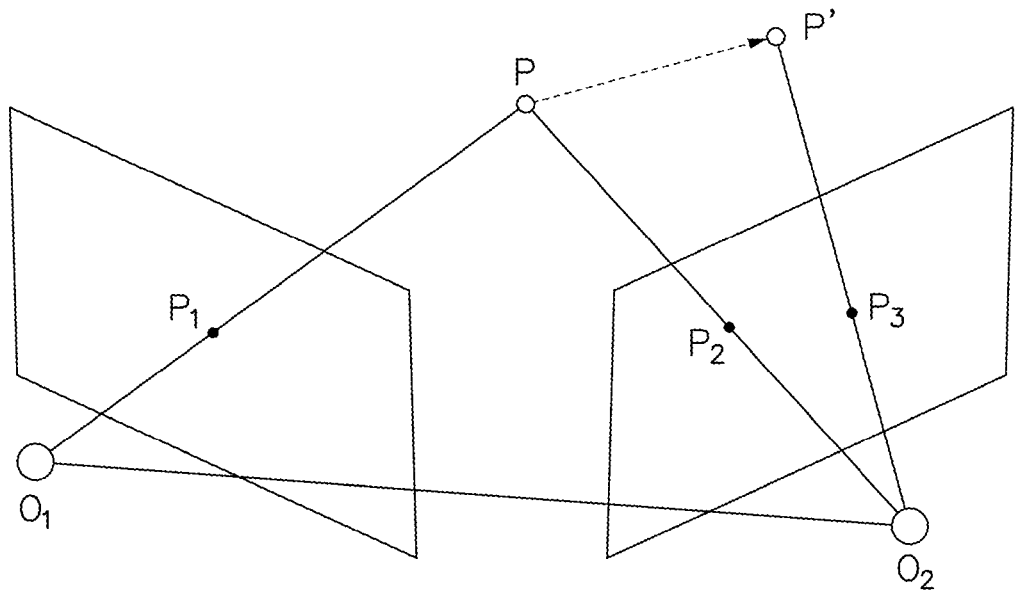
FIG. 2 shows an application scene of an image depth prediction.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates one exemplary embodiment of an image depth prediction method. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block S100.

The image depth prediction method in this embodiment is mainly applied to the dynamic environment of containing dynamic objects. As shown in FIG. 2, a dynamic object refers to an object whose is P in the monocular camera $O_1$ perspective at the previous moment, but P' in the monocular camera $O_2$ perspective at the latter moment. The projection point of P' from the perspective of monocular camera $O_2$ is $P_3$, $(P_1, P_3)$ is the feature point matching of dynamic object. The feature point matching of $(P_1, P_3)$ dynamic objects is different from the perspective transformation pose relationship obtained by the feature point matching of $(P_1, P_2)$ and other static objects. Therefore, SFM technology is mostly applied in the modeling of static objects.

In block S100, an image frames of containing a dynamic object by a monocular camera is acquired and a continuous of object frames and reference frames from the image frames are extracted.

In one embodiment, the monocular images of containing dynamic objects in the current environment can be obtained by a monocular cameras, such as a RGB cameras or an IR cameras. Due to the advantages of convenient installation, small size and low cost of the monocular camera, the surrounding environment information is captured by a monocular camera, it is a broader application prospect in the field of depth estimation.

In one embodiment, object frames and reference frames can be calibrated before using object frames and reference frames to train the depth estimation model, and so as to the subsequent depth model training effect is ensured.

In one embodiment, the continuous object frames and reference frames extracted from image frames are configured to train data in the process of training the depth estimation model, it can reduce the acquisition cost of training data and effectively avoid resorting to too much external image information. Therefore, this way effectively guarantees the learning modeling ability of the depth estimation model and reduces the training cost of the depth estimation model.

In block S200, the object frames are reconstructed to obtain reconstructed frames according to reference frames and a preset depth estimation model, and the reconstruction error between the object frames and the reconstructed frames is obtained.

In one embodiment, object frames are estimated by the depth estimation model to obtain the depth information of object frames. Object frames and reference frames are input into the preset pose estimation model to obtain the camera pose changes between object frames and reference frames. Object frames are reconstructed by the depth information and camera pose changes to obtain reconstructed frames. The brightness difference between object frames and reconstructed frames is calculated to obtain the reconstruction error. Among them, the preset pose estimation model is the existing mature technology, and it is not described in detail.

In one embodiment, the image brightness can be understood as the brightness and the darkness degree of the image. The brightness difference information can be determined by object frames taken by the monocular camera at the previous time and reference frames taken by the monocular camera at the later time. In the process of image brightness recognition, the brightness difference information can be calculated the error between the obtained brightness and the actual brightness, it is the reconstruction error between the object image and the reconstructed image.

In one embodiment, it can apply any possible way to determine the brightness difference between object frames and reconstructed frames, such as model matching, engineering, image process and so no.

In block S300, the image frames are preprocessed to obtain point cloud data and instance segmentation data.

In one embodiment, the instance segmentation data of each pixel in the image frames is obtained based on an instance segmentation network. The point cloud data of the laser lidar is obtained by using a laser lidar to scan the image frames. In other embodiments, the point cloud data and the instance segmentation data can be obtained by other means, which is not restricted in this application.

In block S400, the point cloud data with the instance segmentation data is fused to obtain mask data.

In one embodiment, an extrinsic parameter of monocular camera and the laser lidar are acquired, wherein the extrinsic parameter comprises a rotation matrix and a translation matrix. The point cloud data of the laser lidar is projected into a three-dimensional coordinate system of the monocular camera according to the external parameter. An internal parameter of the monocular camera is acquired, wherein the internal parameter comprises an internal parameter matrix and a distortion parameter matrix. the point in the three-dimensional coordinate system of the monocular camera is projected into an imaging plane according to the internal parameter to obtain a mapping relationship between the point cloud data of the laser lidar and the pixels of the object image. The instance segmentation data of each pixel in the object image is attached to the point cloud data to obtain the mask data by the correspondence mapping relationship.

In one embodiment, the calculation formula in the mapping relationship between the point cloud data of the laser lidar and the pixels of the image frames comprises:

$$ZP_{uv} = Z \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ Z \end{bmatrix} = KP.$$

Wherein, P is a three-dimensional coordinates of point cloud data, Z is the z component of three-dimensional coordinates of point cloud data, $P_{uv}$ is a two-dimensional coordinates of imaging plane, X is a x component of three-dimensional coordinates of point cloud data, Y is a y component of three-dimensional coordinates of point cloud data, and K is an internal parameters of monocular camera. The point cloud data contains velocity information, which can be used to calculate whether the object is moving.

In block S500, a loss function is obtained according to the reconstruction error and the mask data, the depth estimation model is trained based on the loss function until the loss function converges to optimize the depth estimation model.

In one embodiment, the loss function is obtained by the reconstruction error and mask data and can exclude all moving objects in the object image, which overcomes the disadvantage that the original method can only exclude objects moving at the same speed relative to the camera, and eliminates the influence caused by moving objects in dynamic scenes. At the same time, the system error of the depth estimation model is corrected by iterative solution, and the depth estimation accuracy of the depth estimation model is improved.

In one embodiment, the loss value can be calculated as:

Assuming that the segmentation data of the instance is L, the reconstruction error is D, the mask data is M, and the loss function is Loss, the calculation formula involved is as follows:

$$L_{u,v} = \begin{cases} i, & \& i \in I \\ 0, & \& else \end{cases};$$

$$M_{u,v} = \begin{cases} 1, & \& \exists\, u',\, v':L_{u,v} = L_{u',v'} \neq 0 \\ 0, & \& else \end{cases}; \text{ and}$$

$$\text{Loss} = DM.$$

(u', v') is the pixel coordinates of the point cloud data. (u, v) or (u', v') is the pixel coordinates of any picture, I is the serial number set of instance segmentation, the reconstruction error D is a picture of size W*H, the pixel represents the error value, the mask data M is also a picture of size W*H, the pixel is {0,1}.

Wherein loss function Loss is the product of reconstruction error D and mask data M. The result of loss function Loss will retain the error value of reconstruction error D when the pixel value of mask data M is 1, and the retained error value will be taken as the final loss value after averaging. Based on the loss value, the preset depth estimation model can be trained to obtain the optimized depth estimation model without restrictions.

In one embodiment, the reconstruction errors of object frames and reconstructed frames are obtained through the preset pose estimation model and depth estimation model. At the same time, the mask data is obtained by fusing the point cloud data in the object image and the segmentation data. The loss function is obtained by combining the reconstruction error and mask data to train the depth estimation model.

The depth estimation model through the training method can eliminate all moving objects in the monocular image, overcome the disadvantage that the original method can only eliminate the objects moving at the same speed relative to the camera, and eliminate the influence caused by moving objects in dynamic scenes. At the same time, the system error of the preset depth estimation model is corrected by means of iterative solution, and the depth estimation accuracy of the depth estimation model is improved.

In block S600, the depth estimation model is spread forward to calculate a predictive depth image of new object frame.

In one embodiment, a depth estimation model is spread forward to calculate a predictive depth image of new object frame. It can obtain more accurate depth estimation results of dynamic scenes. The depth estimation model trained by the above blocks can significantly improve the accuracy of the depth map when the new image frames are estimated in the video sequence, so that more accurate depth estimation results of dynamic scenes can be obtained.

Figure 3:
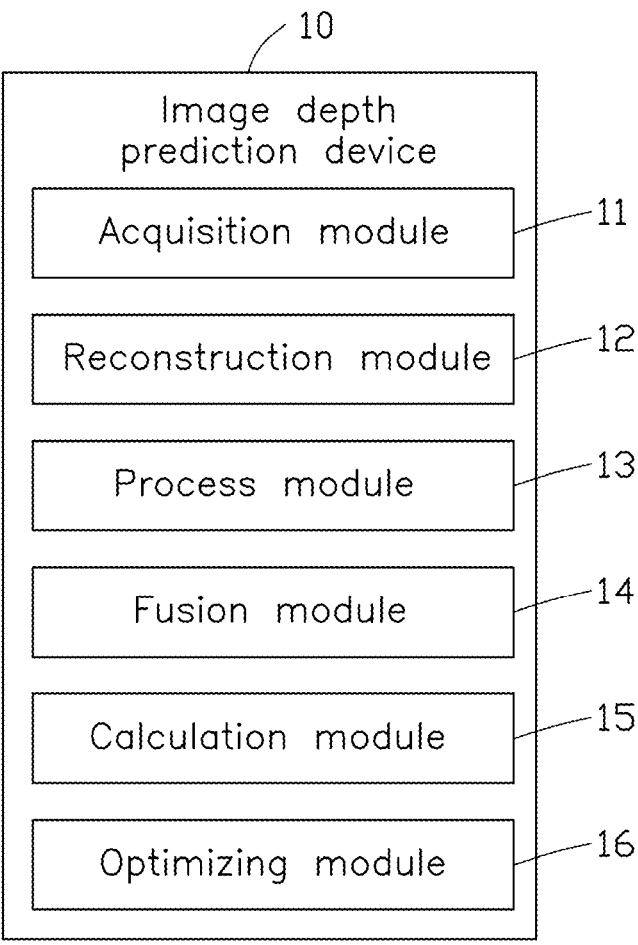
FIG. 3 is a function module diagram of an image depth prediction.

Please refer to FIG. 3, FIG. 3 is the function module diagram of the image depth prediction device 10 provided for this application.

In one embodiment, based on the same idea as the optimization method of the depth estimation model in the above embodiment, this application also provides a image depth prediction device 10. The image depth prediction device 10 can be applied to the image depth prediction method in the above embodiment. In order to facilitate the explanation, the function module diagram of the image depth prediction device 10 only shows the part related to the implementation example of this application. Technicians in this field can understand that the graphic structure does not constitute a limit to the image depth prediction device 10, and can include more or less components than the graphic, or combine some components, or different component arrangements.

In one embodiment, the image depth prediction device 10 comprises: an acquisition module 11, a reconstruction module 12, a process module 13, a fusion module 14, a calculation module 15 and a optimizing module 16. The acquisition module 11 acquires image frames of containing a dynamic object by a monocular camera and extracts a continuous of object frames and reference frames from the image frames; the reconstruction module 12 the object frames to obtain reconstructed frames according to the reference frames and a preset depth estimation model and obtains a reconstruction error between the object frames and the reconstructed frames; the process module 13 processes the image frames to obtain point cloud data and instance segmentation data; the fusion module 14 fuses the point cloud data with the instance segmentation data to obtain mask data; the calculation module 15 obtains a loss function according to the reconstruction error and the mask data and trains the depth estimation model based on the loss function until the loss function converges to optimize the depth estimation model; and the optimizing module 16 spreads forward the depth estimation model to calculate a predictive depth image of new object frames.

Figure 4:
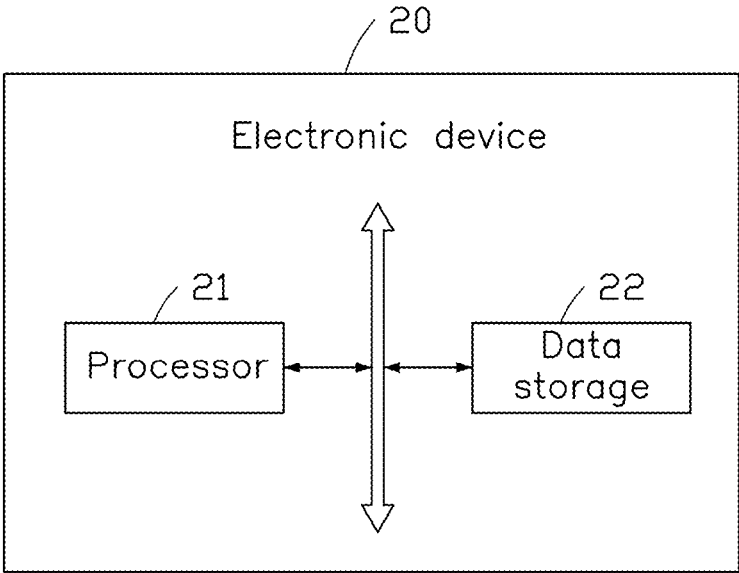
FIG. 4 is shows architecture of an electronic device in one embodiment.

As shown in FIG. 4, one exemplary embodiment of an electronic device 20 comprises at least one processor 21 and a data storage 22. The data storage 22 stores one or more programs which can be executed by the at least one processor 21. The data storage 22 is used to store instructions, and the processor 21 is used to call up instructions from the data storage 22, so that the electronic device 20 performs the steps of the image depth prediction method in the above embodiment. The electronic devices can be desktop computers, laptops, handheld computers, cloud servers and other computing devices. The electronic devices 20 can interact with users through keyboard, mouse, remote control, touchpad or voice control devices.

In one embodiment, a non-transitory storage medium recording instructions is disclosed. When the recorded computer instructions are executed by a processor of an electronic device 20, the electronic device 20 can perform the method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image depth prediction method, comprising:
  acquiring image frames of containing a dynamic object by
    a monocular camera and extracting a continuous of
    object frames and reference frames from the image
    frames;
  reconstructing the object frames to obtain reconstructed
    frames according to the reference frames and a preset
    depth estimation model, and obtaining a reconstruction
    error between the object frames and the reconstructed
    frames;
  processing the image frames to obtain point cloud data
    and instance segmentation data;
  fusing the point cloud data with the instance segmentation
    data to obtain mask data;
  obtaining a loss function according to the reconstruction
    error and the mask data and training the preset depth
    estimation model based on the loss function until the
    loss function converges to optimize the preset depth
    estimation model; and
  spreading forward the preset depth estimation model to
    calculate a predictive depth image of new object
    frames.

2. The image depth prediction method of claim 1, wherein processing the image frames to obtain the point cloud data and the instance segmentation data comprises:
  obtaining instance segmentation data of each pixel in the
    image frames based on an instance segmentation network; and
  obtaining point cloud data of a laser lidar by using the
    laser lidar to scan the image frames.

3. The image depth prediction method of claim 2, wherein fusing the point cloud data with the instance segmentation data to obtain the mask data comprises:
  acquiring an extrinsic parameter of the monocular camera
    and the laser lidar, wherein the extrinsic parameter
    comprises a rotation matrix and a translation matrix;
  projecting the point cloud data of the laser lidar into a
    three-dimensional coordinate system of the monocular
    camera according to the external parameter;
  acquiring an internal parameter of the monocular camera,
    wherein the internal parameter comprises an internal
    parameter matrix and a distortion parameter matrix;
  projecting points of the monocular camera in the three-
    dimensional coordinate system onto an imaging plane
    according to the internal parameter and obtaining a mapping relationship between the point cloud data of the laser lidar and the pixels of the image frames; and attaching the instance segmentation data of each pixel in the image frames to the point cloud data according to the correspondence mapping relationship to obtain the mask data.

4. The image depth prediction method of claim 3, wherein the calculation formula in the mapping relationship between the point cloud data of the laser lidar and the pixels of the image frames comprises:

$$ZP_{uv} = Z \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ Z \end{bmatrix} = KP;$$

where P is a three-dimensional coordinate of the point cloud data, Z is a z component of the three-dimensional coordinates of the point cloud data, $P_{uv}$ is a two-dimensional coordinate of the imaging plane, X is a x component of the three-dimensional coordinates of the point cloud data, Y is a y component of the three-dimensional coordinates of the point cloud data, K is an internal parameter of the monocular camera.

5. The image depth prediction method of claim 1, wherein reconstructing the object frames to obtain the reconstructed frames according to the reference frames and the preset depth estimation model comprises:

performing a depth estimation on the object frames through the preset depth estimation model to obtain depth information of the object frames;

inputting the object frames and the reference frames into a preset pose estimation model to obtain a camera pose change between the object frames and the reference frames; and reconstructing the object frames to obtain reconstructed frames corresponding to the object frames by the depth information and the camera pose change.

6. The image depth prediction method of claim 1, wherein obtaining the reconstruction error between the object frames and the reconstructed frames comprises:

calculating a luminance difference of the object frames and the reconstruction frames to obtain the reconstruction error.

7. An electronic device, comprising:

at least one processor; and a data storage storing one or more programs which when executed by the at least one processor, cause the at least one processor to:

acquire image frames of containing a dynamic object by a monocular camera and extract a continuous of object frames and reference frames from the image frames;

reconstruct the object frames to obtain reconstructed frames according to the reference frames and a preset depth estimation model, and obtain a reconstruction error between the object frames and the reconstructed frames;

process the image frames to obtain point cloud data and instance segmentation data;

fuse the point cloud data with the instance segmentation data to obtain mask data;

obtain a loss function according to the reconstruction error and the mask data and train the preset depth estimation model based on the loss function until the loss function converges; and spread forward the preset depth estimation model to calculate a predictive depth image of a new object frame.

8. The electronic device of claim 7, wherein the at least one processor processing the image frames to obtain the point cloud data and the instance segmentation data comprises:

obtaining instance segmentation data of each pixel in the image frames based on an instance segmentation network; and obtaining point cloud data of a laser lidar by using the laser lidar to scan the image frames.

9. The electronic device of claim 8, wherein the at least one processor fusing the point cloud data with the instance segmentation data to obtain the mask data comprises:

acquiring an extrinsic parameter of the monocular camera and the laser lidar, wherein the extrinsic parameter comprises a rotation matrix and a translation matrix;

projecting the point cloud data of the laser lidar into a three-dimensional coordinate system of the monocular camera according to the external parameter;

acquiring an internal parameter of the monocular camera, wherein the internal parameter comprises an internal parameter matrix and a distortion parameter matrix;

projecting points of the monocular camera in the three-dimensional coordinate system onto an imaging plane according to the internal parameter and obtaining a mapping relationship between the point cloud data of the laser lidar and the pixels of the image frames; and attaching the instance segmentation data of each pixel in the image frames to the point cloud data according to the correspondence mapping relationship to obtain the mask data.

10. The electronic device of claim 9, wherein the calculation formula in the mapping relationship between the point cloud data of the laser lidar and the pixels of the image frames comprises:

$$ZP_{uv} = Z \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ Z \end{bmatrix} = KP;$$

where P is a three-dimensional coordinate of the point cloud data, Z is a z component of the three-dimensional coordinates of the point cloud data, $P_{uv}$ is a two-dimensional coordinate of the imaging plane, X is a x component of the three-dimensional coordinates of the point cloud data, Y is a y component of the three-dimensional coordinates of the point cloud data, K is an internal parameter of the monocular camera.

11. The electronic device of claim 7, wherein the at least one processor reconstructing the object frames to obtain the reconstructed frames according to the reference frames and the preset depth estimation model comprises:

performing a depth estimation on the object frames through the preset depth estimation model to obtain depth information of the object frames;

inputting the object frames and the reference frames into a preset pose estimation model to obtain a camera pose change between the object frames and the reference frames; and reconstructing the object frames to obtain reconstructed frames corresponding to the object frames by the depth information and the camera pose change.

12. The electronic device of claim 7, wherein obtaining the reconstruction error between the object frames and the reconstructed frames comprises:

calculating a luminance difference of the object frames and the reconstruction frames to obtain the reconstruction error.

13. A non-transitory storage medium having stored thereon instructions that, when executed by a processor of an electronic device, causes the electronic device to perform an image depth prediction method, the image depth prediction method comprises:

acquiring image frames of containing a dynamic object by a monocular camera and extracting a continuous of object frames and reference frames from the image frames;

reconstructing the object frames to obtain reconstructed frames according to the reference frames and a preset depth estimation model, and obtaining a reconstruction error between the object frames and the reconstructed frames;

processing the image frames to obtain point cloud data and instance segmentation data;

fusing the point cloud data with the instance segmentation data to obtain mask data;

obtaining a loss function according to the reconstruction error and the mask data and training the preset depth estimation model based on the loss function until the loss function converges; and spreading forward the preset depth estimation model to calculate a predictive depth image of a new object frame.

14. The non-transitory storage medium of claim 13, wherein processing the image frames to obtain the point cloud data and the instance segmentation data comprises:

obtaining instance segmentation data of each pixel in the image frames based on an instance segmentation network; and obtaining point cloud data of a laser lidar by using the laser lidar to scan the image frames.

15. The non-transitory storage medium of claim 14, wherein fusing the point cloud data with the instance segmentation data to obtain the mask data comprises:

acquiring an extrinsic parameter of the monocular camera and the laser lidar, wherein the extrinsic parameter comprises a rotation matrix and a translation matrix;

projecting the point cloud data of the laser lidar into a three-dimensional coordinate system of the monocular camera according to the external parameter;

acquiring an internal parameter of the monocular camera, wherein the internal parameter comprises an internal parameter matrix and a distortion parameter matrix;

projecting points of the monocular camera in the three-dimensional coordinate system onto an imaging plane according to the internal parameter and obtaining a mapping relationship between the point cloud data of the laser lidar and the pixels of the image frames; and attaching the instance segmentation data of each pixel in the image frames to the point cloud data according to the correspondence mapping relationship to obtain the mask data.

16. The non-transitory storage medium of claim 15, wherein the calculation formula in the mapping relationship between the point cloud data of the laser lidar and the pixels of the image frames comprises:

$$ZP_{uv} = Z\begin{bmatrix} u \\ v \\ 1 \end{bmatrix} = \begin{bmatrix} f_x & 0 & c_x \\ 0 & f_y & c_y \\ 0 & 0 & 1 \end{bmatrix}\begin{bmatrix} X \\ Y \\ Z \end{bmatrix} = KP;$$

where P is a three-dimensional coordinate of the point cloud data, Z is a z component of the three-dimensional coordinates of the point cloud data, $P_{uv}$ is a two-dimensional coordinate of the imaging plane, X is a x component of the three-dimensional coordinates of the point cloud data, Y is a y component of the three-dimensional coordinates of the point cloud data, K is an internal parameter of the monocular camera.

17. The non-transitory storage medium of claim 13, wherein reconstructing the object frames to obtain the reconstructed frames according to the reference frames and the preset depth estimation model comprises:

performing a depth estimation on the object frames through the preset depth estimation model to obtain depth information of the object frames;

inputting the object frames and the reference frames into a preset pose estimation model to obtain a camera pose change between the object frames and the reference frames; and reconstructing the object frames to obtain reconstructed frames corresponding to the object frames by the depth information and the camera pose change.

18. The non-transitory storage medium of claim 13, wherein obtaining the reconstruction error between the object frames and the reconstructed frames comprises:

calculating a luminance difference of the object frames and the reconstruction frames to obtain the reconstruction error.

* * * * *